(12) United States Patent
Sasaki

(10) Patent No.: US 11,431,868 B2
(45) Date of Patent: Aug. 30, 2022

(54) INFORMATION PROCESSING APPARATUS, INFORMATION PROCESSING METHOD, AND STORAGE MEDIUM COMPRISING EXTRACTING A CHARACTER STRING FROM A SCANNED DOCUMENT AND DETERMINING IF PRE-DEFINED CANDIDATES OF A SELECTION-TYPE MATCH THE EXTRACTED CHARACTER STRING, DETERMINING WHETHER TO DISPLAY OR NOT DISPLAY ONE OF THE PRE-DEFINED CANDIDATES AS A DEFAULT VALUE BASED ON THE RESULT OF THE MATCH BETWEEN THE EXTRACTED CHARACTER STRING AND THE PRE-DEFINED CANDIDATES

(71) Applicant: CANON KABUSHIKI KAISHA, Tokyo (JP)

(72) Inventor: Yuto Sasaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/893,918

(22) Filed: Jun. 5, 2020

(65) Prior Publication Data
US 2020/0396350 A1 Dec. 17, 2020

(30) Foreign Application Priority Data
Jun. 17, 2019 (JP) .............................. JP2019-111816

(51) Int. Cl.
*G06F 40/174* (2020.01)
*H04N 1/00* (2006.01)
*G06F 40/186* (2020.01)

(52) U.S. Cl.
CPC ....... *H04N 1/00803* (2013.01); *G06F 40/186* (2020.01); *H04N 1/00331* (2013.01);
(Continued)

(58) Field of Classification Search
CPC ............. H04N 1/32133; H04N 1/3872; H04N 2201/0094; G06K 9/00442; G06K 9/183; G06K 9/2063; G06K 9/2081
(Continued)

(56) References Cited

U.S. PATENT DOCUMENTS 8,605,297 B2 * 12/2013 Nielsen ..................... G06K 9/00
358/1.11
2006/0026500 A1 * 2/2006 Qa 'Im-maqami ... G06F 40/174
715/226
(Continued)

FOREIGN PATENT DOCUMENTS

JP 2009-187485 8/2009

*Primary Examiner* — Chad Dickerson
(74) *Attorney, Agent, or Firm* — Venable LLP

(57) ABSTRACT

According to the technology of the present disclosure, candidates of a selection-type value included in metadata in a key-value format, which is registered in association with scanned image data, can be appropriately displayed. An information processing apparatus, which assigns metadata in a key-value format to scanned image data obtained by scanning a document, includes: a first obtaining unit configured to obtain a character string extracted from the scanned image data; a second obtaining unit configured to obtain a template of the metadata; a display control unit configured to display a screen for inputting the metadata; and a setting unit configured to set a value in association with the scanned image data, based on operation by a user via the screen, the value corresponding to a key included in the template of the metadata obtained by the second obtaining unit.

15 Claims, 17 Drawing Sheets

(52) U.S. Cl.
CPC ..... *H04N 1/00421* (2013.01); *H04N 1/00424* (2013.01); *H04N 1/00766* (2013.01); *H04N 1/00782* (2013.01)

(58) Field of Classification Search
USPC ........................................ 358/1.11–1.18, 2.1
See application file for complete search history.

(56) References Cited

U.S. PATENT DOCUMENTS

| | | | |
|---|---|---|---|
| 2009/0204607 A1 | 8/2009 | Matsuzawa | ........................ 707/5 |
| 2013/0055069 A1* | 2/2013 | Seo | ........................ G06F 40/186 |
| | | | 715/234 |
| 2014/0258838 A1* | 9/2014 | Evers | .................... G06F 40/174 |
| | | | 715/234 |
| 2015/0215491 A1* | 7/2015 | Faust | ................. H04N 1/32133 |
| | | | 715/780 |
| 2016/0366240 A1* | 12/2016 | Haapanen | ............... H04L 41/22 |

\* cited by examiner

Figure 8:
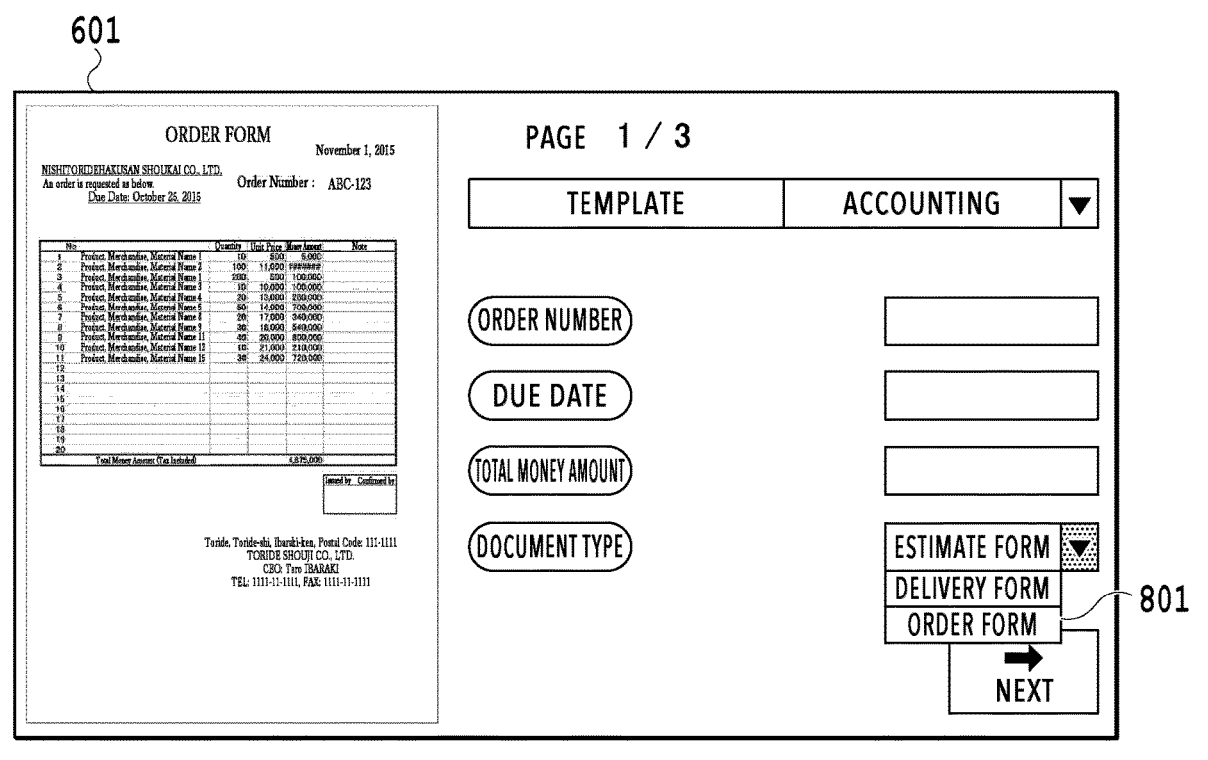

PAGE 1 / 3

| TEMPLATE | ACCOUNTING ▼ |

ORDER NUMBER
DUE DATE
TOTAL MONEY AMOUNT
DOCUMENT TYPE

ESTIMATE FORM ▼
DELIVERY FORM
ORDER FORM        ~801

→ NEXT

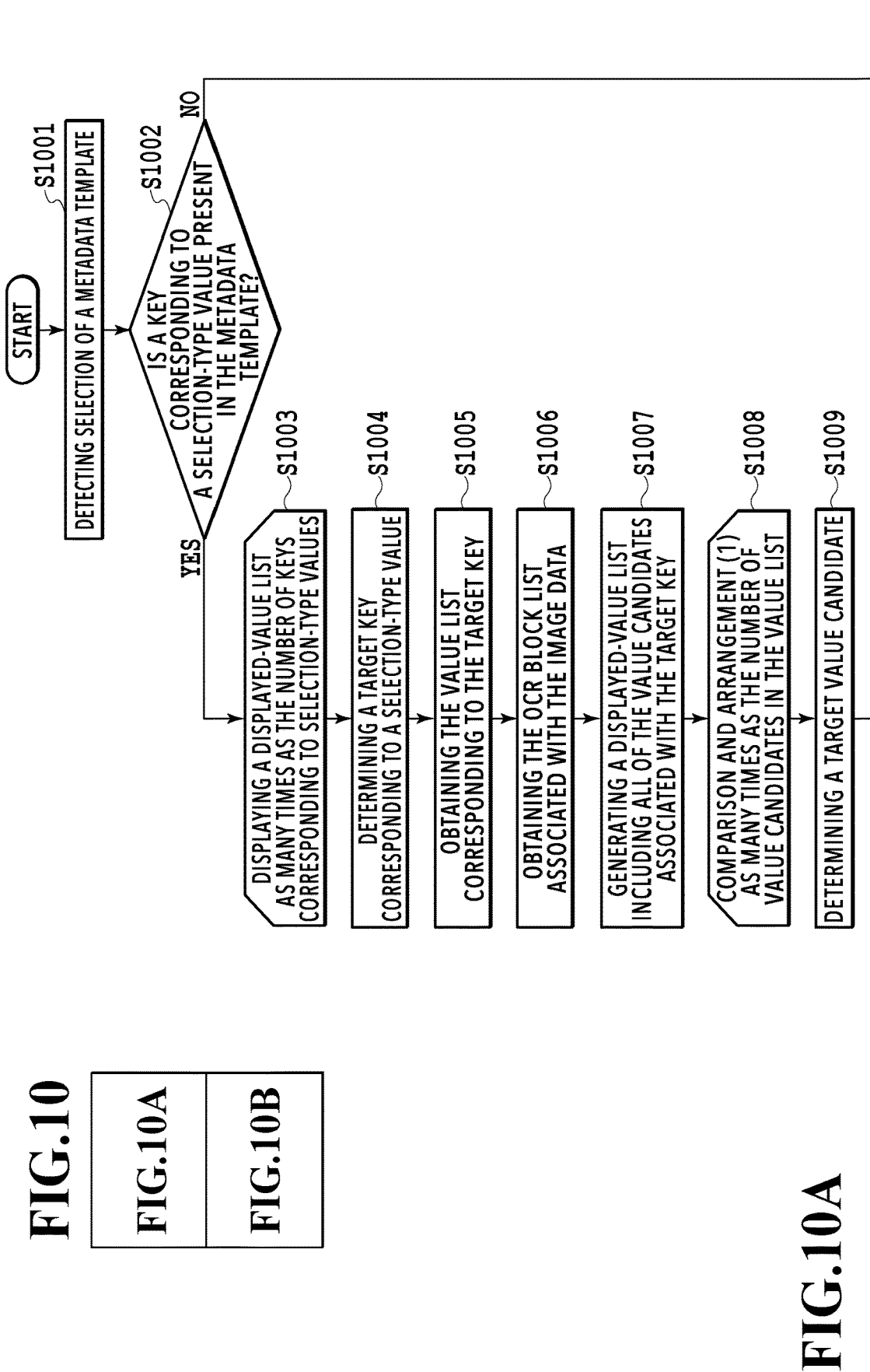

Figures 11A, 11B:
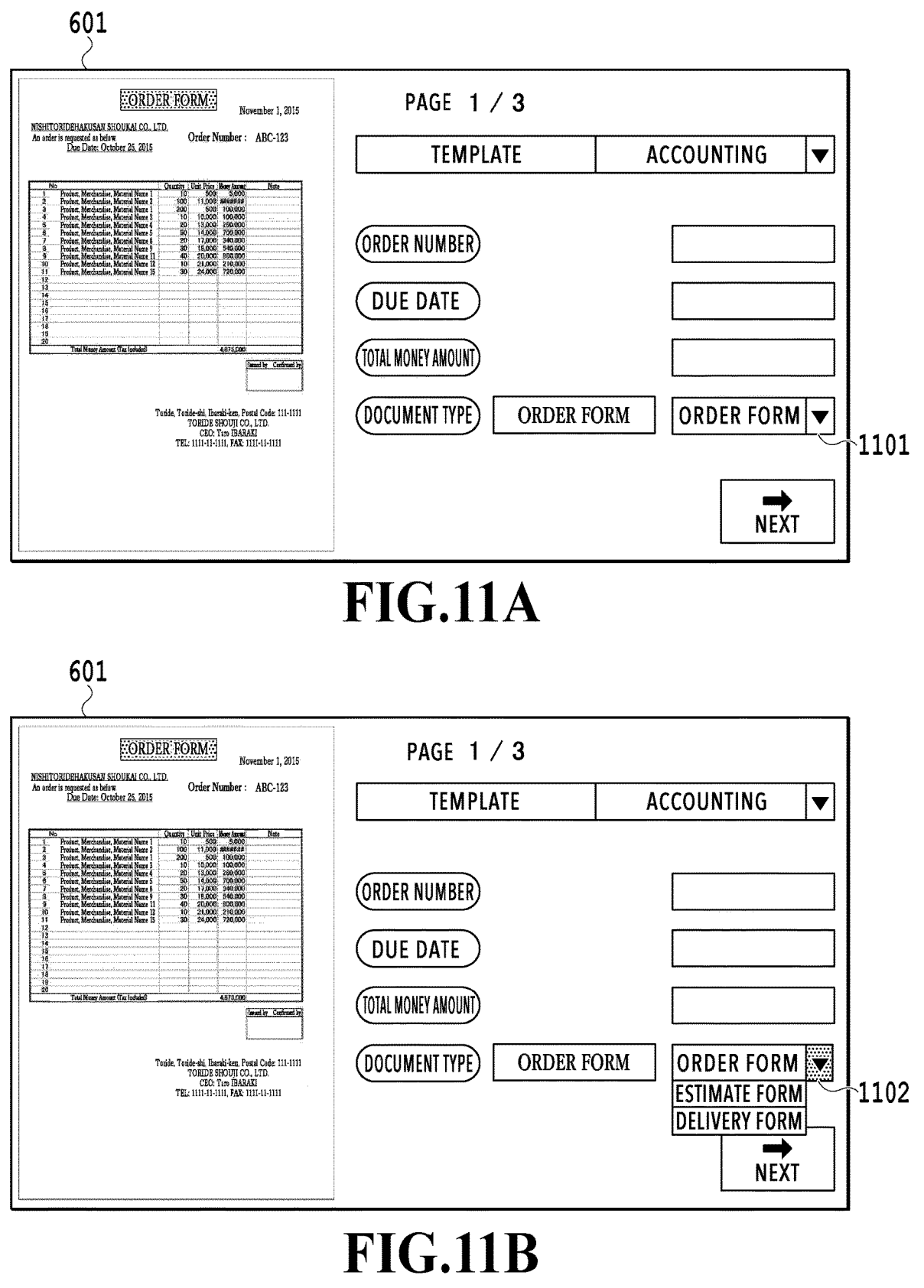

PAGE 1 / 3

| TEMPLATE | ACCOUNTING ▼ |

ORDER NUMBER

DUE DATE

TOTAL MONEY AMOUNT

DOCUMENT TYPE | ORDER FORM | ORDER FORM ▼ — 1101

→ NEXT

PAGE 1 / 3

| TEMPLATE | ACCOUNTING ▼ |

ORDER NUMBER

DUE DATE

TOTAL MONEY AMOUNT

DOCUMENT TYPE | ORDER FORM | ORDER FORM ▼
ESTIMATE FORM — 1102
DELIVERY FORM

→ NEXT

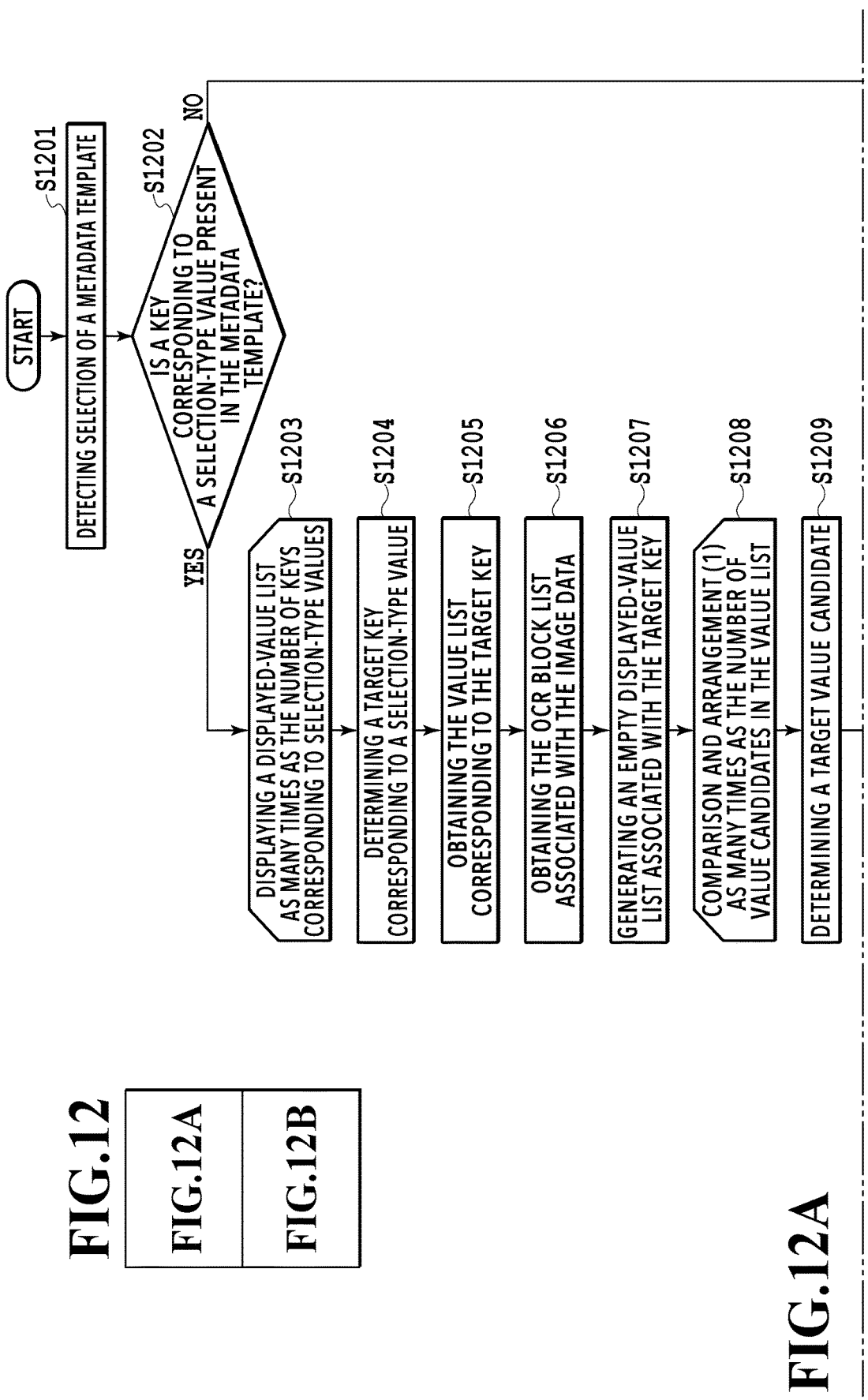

INFORMATION PROCESSING APPARATUS, INFORMATION PROCESSING METHOD, AND STORAGE MEDIUM COMPRISING EXTRACTING A CHARACTER STRING FROM A SCANNED DOCUMENT AND DETERMINING IF PRE-DEFINED CANDIDATES OF A SELECTION-TYPE MATCH THE EXTRACTED CHARACTER STRING, DETERMINING WHETHER TO DISPLAY OR NOT DISPLAY ONE OF THE PRE-DEFINED CANDIDATES AS A DEFAULT VALUE BASED ON THE RESULT OF THE MATCH BETWEEN THE EXTRACTED CHARACTER STRING AND THE PRE-DEFINED CANDIDATES

BACKGROUND OF THE INVENTION

Field of the Invention

The present disclosure relates to a technology of extracting character information from image data and assigning metadata to image data.

Description of the Related Art

Conventionally, regarding a multifunction peripheral, there is a technology of extracting a character string from image data (hereinafter referred to as scanned image data) obtained by scanning a document by use of an image reading device. By performing OCR (optical character recognition) processing to scanned image data, a character string in the scanned image data can be extracted as digital data.

Furthermore, there is a technology in which the character string data extracted in the above way is divided into blocks and associated with given keys. According to the present technology, it is possible to save metadata in a key-value format, in which a value at a given position of the scanned image is associated with a given key as a value, in a server. Here, data in a key-value format is data of a data structure in which a key and a value are stored as a pair. That is, a value to be an identifier is set as the key, and a given value is set as the corresponding value. For example, a value of "ORDER FORM" is set for a key of "DOCUMENT TYPE", and the value and the key can be saved in association with each other. Accordingly, by designating a key, the corresponding value can be called from a database configured with data in a key-value format.

Furthermore, there is also a storage service in which such given data in a key-value format is associated with scanned image data as metadata and registered in a server. By utilizing such a storage service, it is possible for the user to search for a character string with a given key and to import data to a subsequent system.

There is a technology of obtaining metadata candidates from scanned image data by use of login information of the user, so as to register the scanned image data associated with metadata in a key-value format in such a storage service (cf. Japanese Patent Laid-Open No. 2009-187485). In the configuration disclosed in Japanese Patent Laid-Open No. 2009-187485, in a case where the user newly registers scanned image data in the storage service, metadata that have been registered in the past can be displayed for the user as metadata candidates for the scanned image data to be newly registered, according to login information of the user.

In some of such storage services capable of registering metadata in a key-value format, the data type is set for a value corresponding to a key. Data types include text-type, numeric-value-type, date-type, selection-type, etc., and there are restrictions on the values that can be input, depending on the respective data types. Particularly, in a case of a selection-type value, it is necessary to select a value to be set from predefined values.

However, in the configuration disclosed in Japanese Patent Laid-Open No. 2009-187485, even though selection-type values are included in metadata in a key-value format that are set by the storage service, candidates of selection-type values cannot be obtained unless having been registered in the past. For this reason, there have been cases where candidates of selection-type values are not appropriately displayed.

Therefore, the purpose of the technology of the present disclosure is to appropriately display candidates of a selection-type value included in metadata in a key-value format, which is registered in association with scanned image data.

SUMMARY OF THE INVENTION

The technology of the present disclosure is an information processing apparatus that assigns metadata in a key-value format to scanned image data obtained by scanning a document, the information processing apparatus including: a first obtaining unit configured to obtain a character string extracted from the scanned image data; a second obtaining unit configured to obtain a template of the metadata; a display control unit configured to display a user interface (UI) screen for inputting the metadata; and a setting unit configured to set a value in association with the scanned image data, based on operation by a user via the UI screen, the value corresponding to a key included in the template of the metadata obtained by the second obtaining unit, wherein, in the template of the metadata, a key as well as a data type defined for a value corresponding to each key are designated, and in a case where the data type of the value is selection-type, a value list for defining candidates of the value is further designated, and wherein the display control unit is configured to preferentially display one or more candidates of the value from among the candidates of the value included in the value list, the one or more candidates of the value at least partially matching the extracted character string, which is obtained by the first obtaining unit.

Further features of the present invention will become apparent from the following description of exemplary embodiments with reference to the attached drawings.

BRIEF DESCRIPTION OF THE DRAWINGS

FIG. 6 is an example of a configuration diagram of a metadata setting screen;

FIG. 8 is an example of a screen display at the time where a drop-down selection form is pressed on a metadata setting screen;

FIG. 9 is an example of a screen after setting all items on a metadata setting screen;

FIG. 10 is a diagram representing a relationship between FIGS. 10A and 10B;

FIGS. 10A and 10B are an example of a flow of generating a displayed-metadata list and displaying metadata in the first embodiment;

FIG. 11A is an example of a screen flow at the time where a drop-down selection form is pressed in the first embodiment;

FIG. 11B is an example of a screen flow at the time where a drop-down selection form is pressed in the first embodiment;

FIG. 12 is a diagram representing a relationship between FIGS. 12A and 12B;

FIGS. 12A and 12B are an example of a flow of generating a displayed-metadata list and displaying metadata in the second embodiment;

FIG. 13A is an example of a screen flow at the time where a drop-down selection form is pressed in a case where a value is present in a displayed-metadata list in the second embodiment;

FIG. 13B is an example of a screen flow at the time where a drop-down selection form is pressed in a case where a value is included in a displayed-metadata list in the second embodiment;

DESCRIPTION OF THE EMBODIMENTS

Hereinafter, an explanation is given of embodiments for implementing the technology of the present disclosure with reference to the drawings. Note that the following embodiments are merely examples, and it is not intended that the following embodiments limit the scope of the technology of the present disclosure.

First Embodiment

Figure 1:
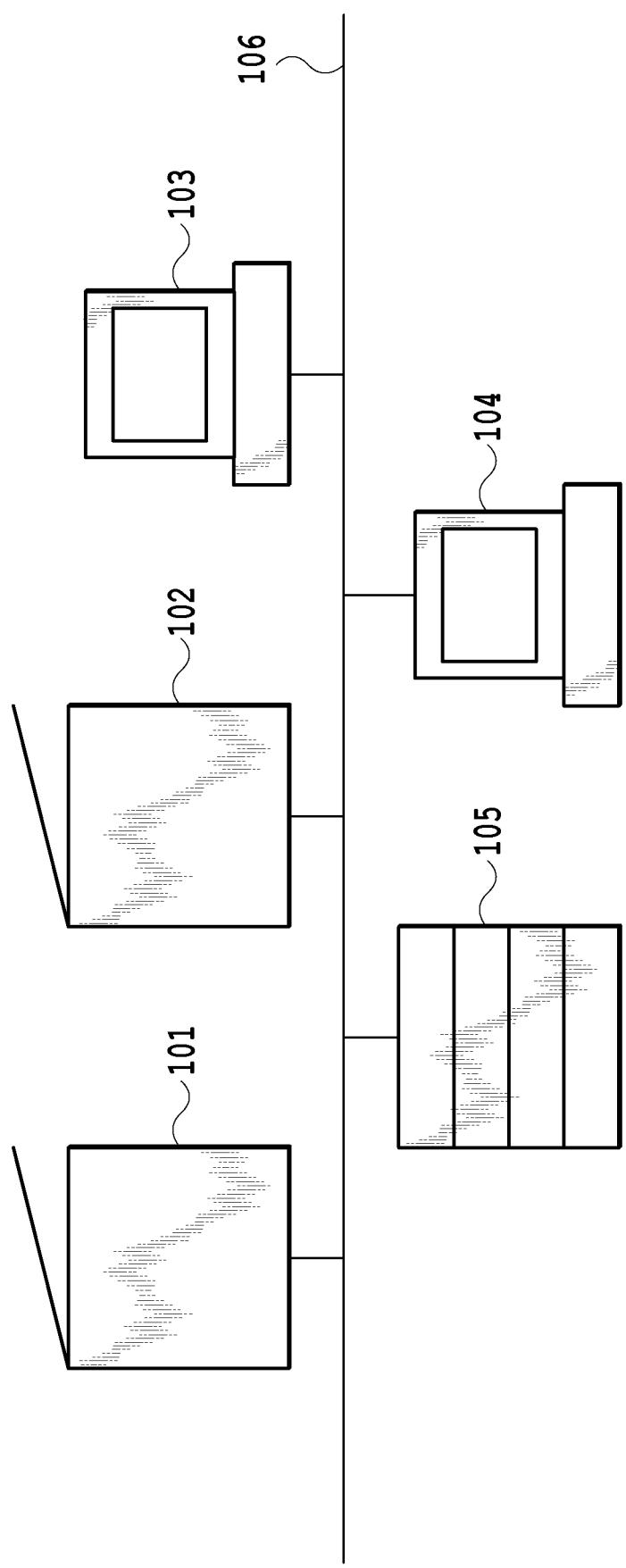
FIG. 1 is a diagram illustrating a configuration example of an image processing system.

FIG. 1 is a diagram illustrating an example of the configuration of an image processing system. The image processing system includes multifunction peripherals (MFPs) 101 and 102, information processing terminals 103 and 104, and a server 105. The MFPs 101 and 102, the information processing terminals 103 and 104, and the server 105 are mutually connected via a network 106 and are capable of performing data communication.

Although the example in which there are two MFPs 101 and 102 is illustrated in FIG. 1, a given number (one or more) of MFPs is possible. Furthermore, the MFPs 101 and 102 can be realized by MFPs of the same type, respectively. Therefore, hereinafter, an explanation is given of the MFP 101 as the representative of the MFPs 101 and 102, and a detailed explanation of the MFP 102 is omitted. Noted that the network 106 may be any type of network as long as the network enables devices in the image processing system to communicate with each other, such as a LAN (Local Area Network) or the Internet.

The MFP 101 is capable of receiving a printing request (print data) of image data from the information processing terminal 103 or 104 and printing the image data. Furthermore, the MFP 101 is capable of reading image data by use of an image reading device (hereinafter referred to as a scanner) provided in the MFP 101 and is capable of printing image data read by the scanner. Moreover, the MFP 101 is capable of saving print data received from the information processing terminal 103 or 104 and is capable of transmitting scanned image data, which is read by the scanner of the MFP 101, to the information processing terminal 103 or 104.

Furthermore, the MFP 101 is capable of saving image data in the server 105, performing image processing by use of the server 105, and printing document data stored in the server 105. Although the example in which there is one server is illustrated in FIG. 1, a given number (one or more) of servers is possible. Moreover, each server may have a different role. For example, there may be such a configuration in which a storage server that saves image data and an image processing server that performs image processing are different servers. In addition, in the present configuration, the server 105 may be a cloud server.

Figure 2:
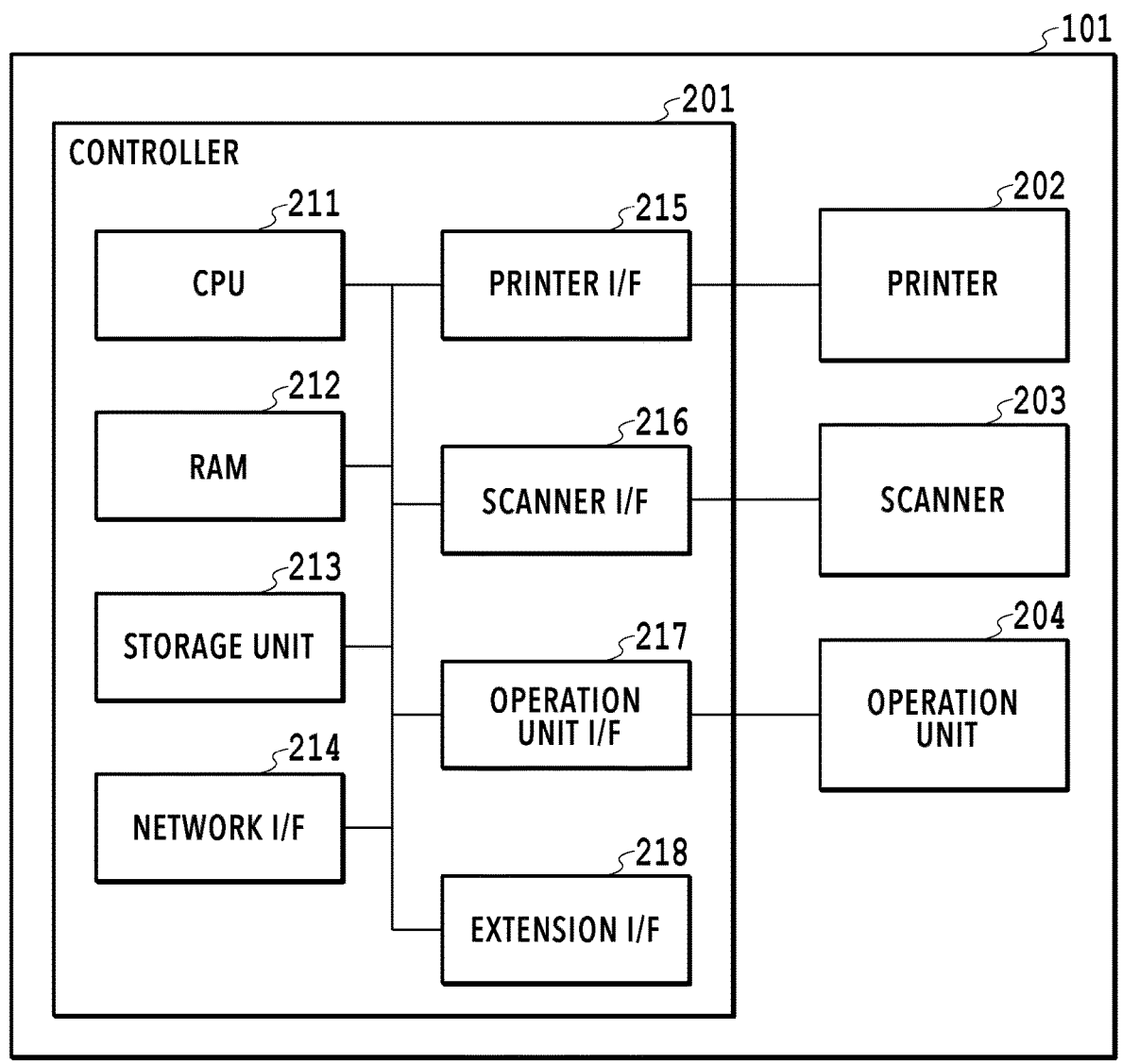
FIG. 2 is a diagram illustrating a configuration example of a multifunction peripheral.

FIG. 2 is a diagram illustrating an example of the configuration of the MFP 101. The MFP 101 includes a controller 201, a printer 202, a scanner 203, and an operation unit 204. The controller 201 includes a CPU 211, a RAM 212, a storage unit 213, a network I/F 214, a printer I/F 215, a scanner I/F 216, an operation unit I/F 217, and an extension I/F 218. The CPU 211 is capable of transmitting and receiving data to and from the RAM 212, the storage unit 213, the network I/F 214, the printer I/F 215, the scanner I/F 216, the operation unit I/F 217, and the extension I/F 218. Furthermore, the CPU 211 retrieves a command from the storage unit 213 into the RAM 212 and executes the command retrieved into the RAM 212.

The storage unit 213 is capable of storing a command that is executable by the CPU 211, a set value to be used in the MFP 101, data related to a process requested by the user, and the like. Further, an HDD, an SSD, an optical disk drive, or the like, may be used as the storage unit 213. The RAM 212 is an area for temporarily storing a command retrieved from the storage unit 213 by the CPU 211. Furthermore, the RAM 212 is also capable of storing various kinds of data necessary for executing a command. For example, in image processing, processing can be performed by retrieving input data into the RAM 212.

The network I/F 214 is an interface for performing network communication with devices in the image processing system. The network I/F 214 is capable of receiving data from an external apparatus, transmitting received data to the CPU 211, and transmitting data in the RAM 212 to an external apparatus on the network 106.

The printer I/F 215 is capable of transmitting print data transmitted from the CPU 211 to the printer 202. Further, the printer I/F 215 is capable of transmitting data related to a status of a printer, which is received from the printer 202, to the CPU 211.

The scanner I/F 216 is capable of transmitting an image reading instruction transmitted from the CPU 211 to the scanner 203. Further, the scanner I/F 216 is capable of transmitting scanned image data received from the scanner 203 to the CPU 211. Moreover, the scanner I/F 216 is capable of transmitting data related to a status of a scanner, which is received from the scanner 203, to the CPU 211.

The operation unit I/F 217 is capable of transmitting an instruction from the user, which is input via the operation unit 204, to the CPU 211. Further, the operation unit OF 217 is capable of transmitting screen information, which is used for operation by the user, from the CPU 211 to the operation unit 204.

The extension I/F 218 is an interface that enables an external apparatus to be connected to the MFP 101. For example, the extension I/F 218 includes an interface of a USB (Universal Serial Bus) form. In a case where an external storage device such as a USB memory is connected to the extension I/F 218, the MFP 101 is capable of reading data stored in the external storage device and is capable of writing data to the external storage device.

The printer 202 is capable of performing printing on a sheet, based on print data received from the printer I/F 215. Further, the printer 202 is capable of transmitting data related to a status of the printer 202 to the printer I/F 215.

The scanner 203 is capable of reading and digitalizing an image on a sheet, which is placed on a document positioning plate, according to an image reading instruction received from the scanner I/F 216. Further, the scanner 203 is capable of transmitting the digitalized scanned image data to the scanner I/F 216. Moreover, the scanner 203 is capable of transmitting data related to a status of the scanner 203 to the scanner I/F 216.

The operation unit 204 provides an interface for the user to perform operations for providing various kinds of instructions to the MFP 101. For example, the operation unit 204 is provided with a liquid crystal screen including a touch panel. Further, the operation unit 204 displays an operation screen on the liquid crystal screen and receives an operation from the user. Note that the operation unit 204 is later described in detail.

Figure 3:
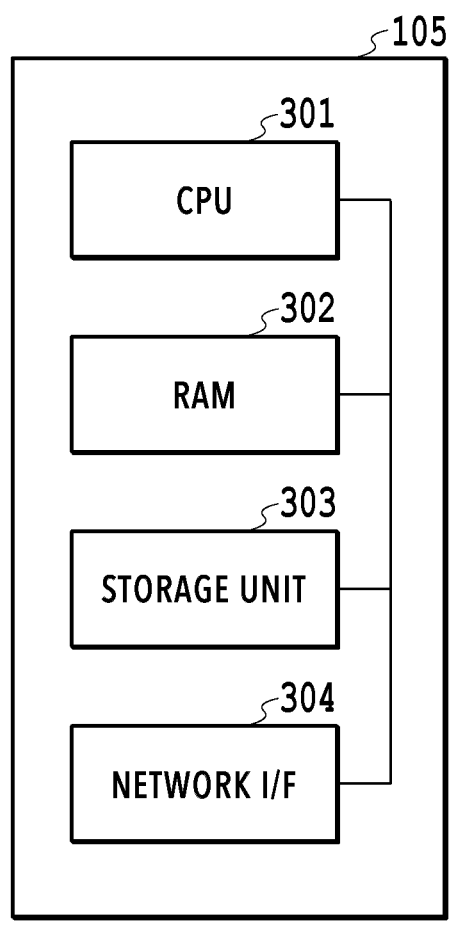
FIG. 3 is a diagram illustrating a configuration example of a server.

FIG. 3 is a configuration diagram of the server 105. The server 105 is configured with a CPU 301, a RAM 302, a storage unit 303, and a network I/F 304. The CPU 301 is a processor that controls the entire apparatus. Further, the CPU 301 is capable of controlling reception and transmission of data among the RAM 302, the storage unit 303, and the network I/F 304. Moreover, the CPU 301 is capable of retrieving a control program (command) from the storage unit 303 into the RAM 302 and executing the command stored in the RAM 302.

The storage unit 303 is capable of accumulating scanned image data received from the MFP 101 via the network I/F 304. Furthermore, the server 105 is capable of assigning a metadata template and metadata associated with the metadata template to received scanned image data and is capable of saving the received scanned image data in the storage unit 303. Table 1 and Table 2 are examples of metadata that can be set for scanned image data.

Table 1 is an example of metadata templates and the structure of metadata thereof. In the example of Table 1, "ACCOUNTING" or "LEGAL AFFAIRS" can be set as a metadata template. A metadata template represents the classification of a target scanned image data itself, and different metadata can be set according to metadata templates. For example, in the example of Table 1, in a case where "ACCOUNTING" is set as the metadata template, it is possible to set "ORDER NUMBER", "DUE DATE", "TOTAL MONEY AMOUNT", and "DOCUMENT TYPE" as the metadata of scanned image data that is classified into "ACCOUNTING". On the other hand, in a case where "LEGAL AFFAIRS" is set as the metadata template, it is possible to set "CASE NUMBER", "CLIENT", and "DATE" as the metadata of scanned image data that is classified into "LEGAL AFFAIRS". Here, an explanation is given of the case in which "ACCOUNTING" is set as the metadata template.

Each metadata includes a key and a value, and an attribute to be assigned to the metadata template thereof can be set as the key. Further, a value corresponding to the key can be set as the value. Note that a data type is present for a value, and the data type may be text-type, date-type, numeric-value-type, or selection-type. For input of date-type, only a predefined date expression is allowed. For example, in a case where a character string such as yyyy/mm/dd (e.g., 2020/10/10) is defined for date-type, only input that follows the character string rule is allowed. For input of selection-type, value candidates are predefined, and only a value that is defined as a value candidate is allowed. For example, as illustrated in Table 2, in a case where three values "ESTIMATE FORM", "DELIVERY FORM", and "ORDER FORM" are defined for a "DOCUMENT TYPE" key, it is possible for the user to select only one of the three values, and other values cannot be set.

In the example of Table 1, the "ORDER NUMBER" key is present in the template of "ACCOUNTING", and a text-type value can be set as the corresponding value. In the example of Table 1, the value "ABC-123" is described as a value example.

Furthermore, similarly, the "DUE DATE" key is present in the template of "ACCOUNTING", and a date-type value can be set as the corresponding value. For setting of date-type, only a normalized expression, such as "2015-10-25" or "2015/10/25" for expressing Oct. 25, 2015, is allowed. In this case, since it is assumed that the server 105 adopts a form of "yyyy/mm/dd", the value "2015/10/25" is described as a value example. Note that, in addition to the above-

TABLE 1

| METADATA TEMPLATE | ACCOUNTING | | | LEGAL AFFAIRS | | |
|---|---|---|---|---|---|---|
| | KEY | DATA TYPE OF VALUE | VALUE EXAMPLE | KEY | DATA TYPE OF VALUE | VALUE EXAMPLE |
| METADATA | ORDER NUMBER | TEXT-TYPE | ABC-123 | CASE NUMBER | TEXT-TYPE | CDF1111 |
| | DUE DATE | DATE-TYPE | 2015 Oct. 25 | CLIENT | TEXT-TYPE | TARO KAWASAKI |
| | TOTAL MONEY AMOUNT | NUMERIC-VALUE-TYPE | 47875000 | DATE | DATE-TYPE | 2017 Dec. 22 |
| | DOCUMENT TYPE | SELECTION-TYPE | (CF. Table 2) | | | |

TABLE 2

| DOCUMENT TYPE OPTION | ESTIMATE FORM | DELIVERY FORM | ORDER FORM |
|---|---|---|---| described examples, any other expressions that normalize a date are allowed for setting of date-type.

Furthermore, similarly, the "TOTAL MONEY AMOUNT" key is present in the metadata template of "ACCOUNTING", and a numeric-value-type value can be set as the corresponding value. For input of numeric-value-type, only a numeric value is allowed. In the example of Table 1, "47875000" is described as a value example of "TOTAL MONEY AMOUNT". A non-numeric character string, or the like, cannot be set as a value of numeric-value-type.

Furthermore, similarly, the "DOCUMENT TYPE" key is present in the metadata template of "ACCOUNTING", and a selection-type value can be set as the corresponding value. In the example of Table 1, it is assumed that the values of Table 2 can be selected as the value example. Here, for the "DOCUMENT TYPE" key, any one of the three values "ESTIMATE FORM", "DELIVERY FORM", and "ORDER FORM" can be set as the value. In a case where selection-type is set as the data type of a value, it is necessary that a user or an administrator, etc., preliminarily provides the server 105 with a setting of value candidates for each key corresponding to a selection-type value.

Similarly, in the metadata template of "LEGAL AFFAIRS", setting for "CASE NUMBER", "CLIENT", and "DATE" can be provided in "TEXT-TYPE", "TEXT-TYPE", and "DATE-TYPE", respectively. In Table 1, "CDF1111", "TARO KAWASAKI", and "2017/12/22" are described as value examples.

As described above, by setting a metadata template and assigning metadata for scanned image data stored in the storage unit 303 of the server 105, it is possible for the user to search in the server 105 with designation of metadata. For example, in the example of Table 1, it is possible to search for the metadata template of "ACCOUNTING" and to search for a document whose metadata template is "ACCOUNTING" and "DOCUMENT TYPE" is "ORDER FORM", etc. As described above, in a case of searching for desired scanned image data, it is possible to narrow down scanned image data with at least one of a key and a value and search for the desired scanned image data, so that more efficient searching can be performed, compared to a case in which searching in all data is performed by use of a file name, etc.

Furthermore, by assigning metadata to scanned image data stored in the storage unit 303 of the server 105, cooperation with subsequent systems becomes easy. For example, conventionally, in a case of inputting scanned image data and accounting information to a given accounting system, it has been necessary to manually transcribe accounting information described in a document after uploading scanned image data of the document. Here, by reading necessary accounting information from scanned image data at the time of uploading the scanned image data to the present server 105 and by assigning the accounting information to the scanned image data in a form of metadata, it is possible to directly register the accounting information to an accounting system. In this way, it is possible to reduce the amount of manual transcription work.

The server 105 is also capable of performing image processing. Here, the image processing may be OCR processing or block selection processing as described above but may be other processing. Since the server 105 has the image processing function, even though the MFP 101 has limited resources, it is possible to transmit scanned image data to the server 105 so as to perform image processing on the server 105. Thereby, provision of advanced functions can be realized.

Figure 4:
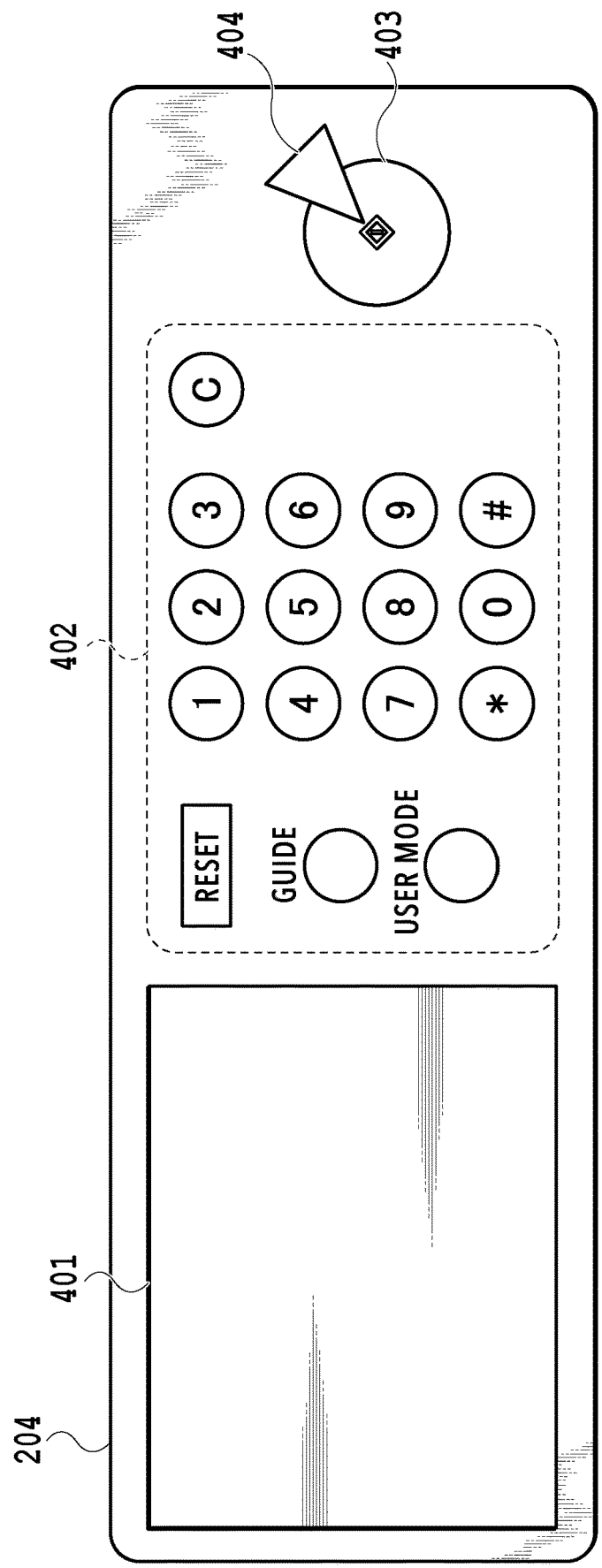
FIG. 4 is a diagram illustrating a configuration example of an operation unit.

FIG. 4 is a diagram illustrating an example of the operation unit 204 of the MFP 101. The operation unit 204 is configured with a touch panel screen 401, a setting key 402, a start key 403, and a cancel key 404. The user performs setting of each job by use of the touch panel screen 401 and setting keys 402 and starts a job by pressing the start key 403. Note that a once-started job can be stopped during the job by pressing the cancel key 404. For example, a job described herein includes a copy job and scanned image data, to which metadata is assigned, being transmitted to the server 105 via the network I/F 214.

Figure 15:
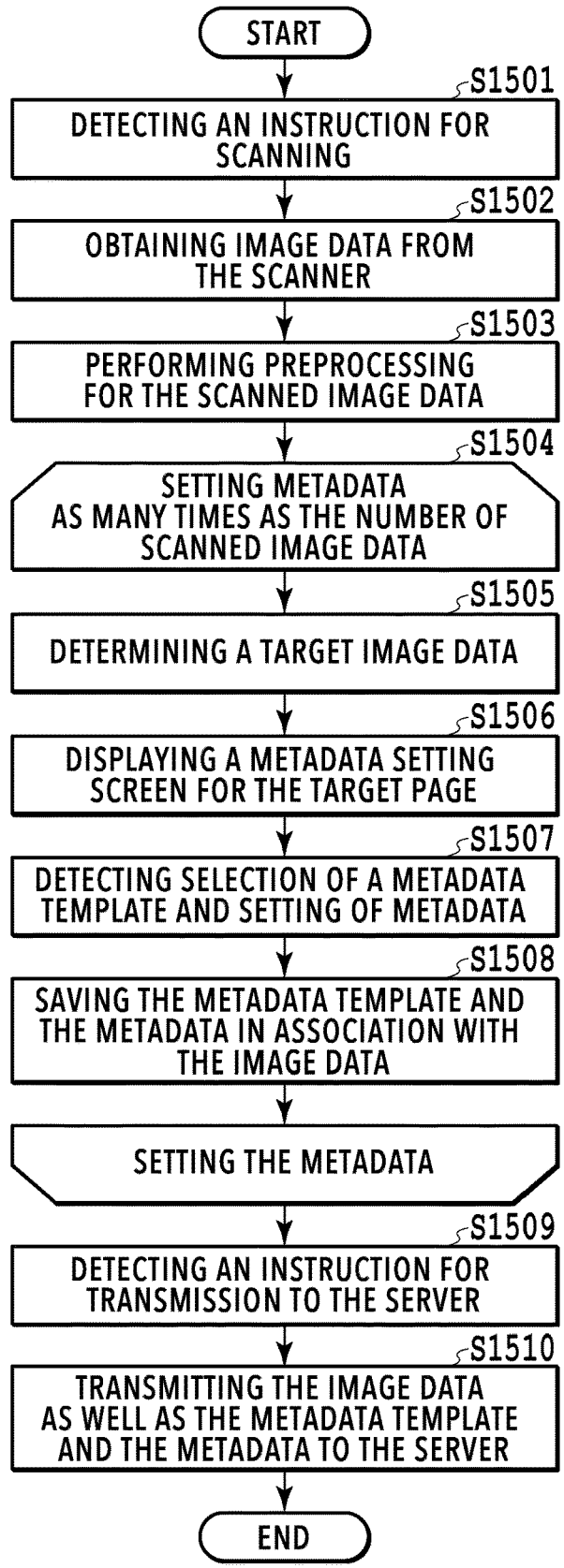
FIG. 15 is an example of a flow of transmitting a metadata template and metadata to a server.

Next, with reference to FIG. 15, an explanation is given of the sequence of a flow of setting a metadata template and metadata for scanned image data and transmitting the scanned image data to a server, which is performed in the present embodiment.

FIG. 15 is a diagram illustrating the sequence of a flow in which the MFP 101 sets a metadata template and metadata for scanned image data and transmits the scanned image data to a server. Note that programs related to the processing illustrated in the present flowchart are stored in the storage unit 213 of the MFP 101, called by the RAM 212, and executed by the CPU 211.

In S1501, in response to pressing of the start key 403, or the like, the CPU 211 receives an instruction for scanning.

In S1502, the CPU 211 provides the scanner 203 with an instruction for scanning, so as to scan a document and obtain scanned image data.

Subsequently, in S1503, the CPU 211 executes preprocessing on the scanned image data, so as to display a metadata setting screen. Note that details of the present processing are explained with reference to FIG. 5.

In S1504, the CPU 211 sets metadata for all the scanned image data by repeating the following steps S1505 through S1508 as many times as the number of scanned image data.

In S1505, the CPU 211 determines one target scanned image data for which metadata is to be set, based on a predetermined criterion such as the order of scanning, from among the scanned image data for which metadata is not set.

In S1506, the CPU 211 performs display control of a metadata setting screen, which is a UI screen for setting metadata for the determined target scanned image data. Details of the metadata setting screen are explained with reference to FIG. 6.

In S1507, the CPU 211 detects setting of a metadata template and metadata, which is input by the user via the operation unit 204.

In S1508, the CPU 211 saves the metadata template and the metadata, which are set by the user, in association with the scanned image data.

By determining whether scanned image data for which metadata is not set is present other than the target scanned image data or not, the processes of S1505 through S1508 are repeated until metadata is set for all the scanned image data.

In a case where metadata is set for all the scanned image data, the CPU 211 exits the loop of S1504 and jumps to S1509, so as to detect an instruction for transmission to the server, which is input by the user via the operation unit 204.

In S1510, the CPU 211 transmits the scanned image data as well as the metadata templates and the metadata associated with the scanned image data to the server, based on the received instruction for transmission.

Next, with reference to FIGS. 5 through 9, an explanation is given of an operation flow of the user and a processing flow of the MFP 101 for assigning metadata to scanned image data and for executing a job transmitted to the server 105.

Figure 5:
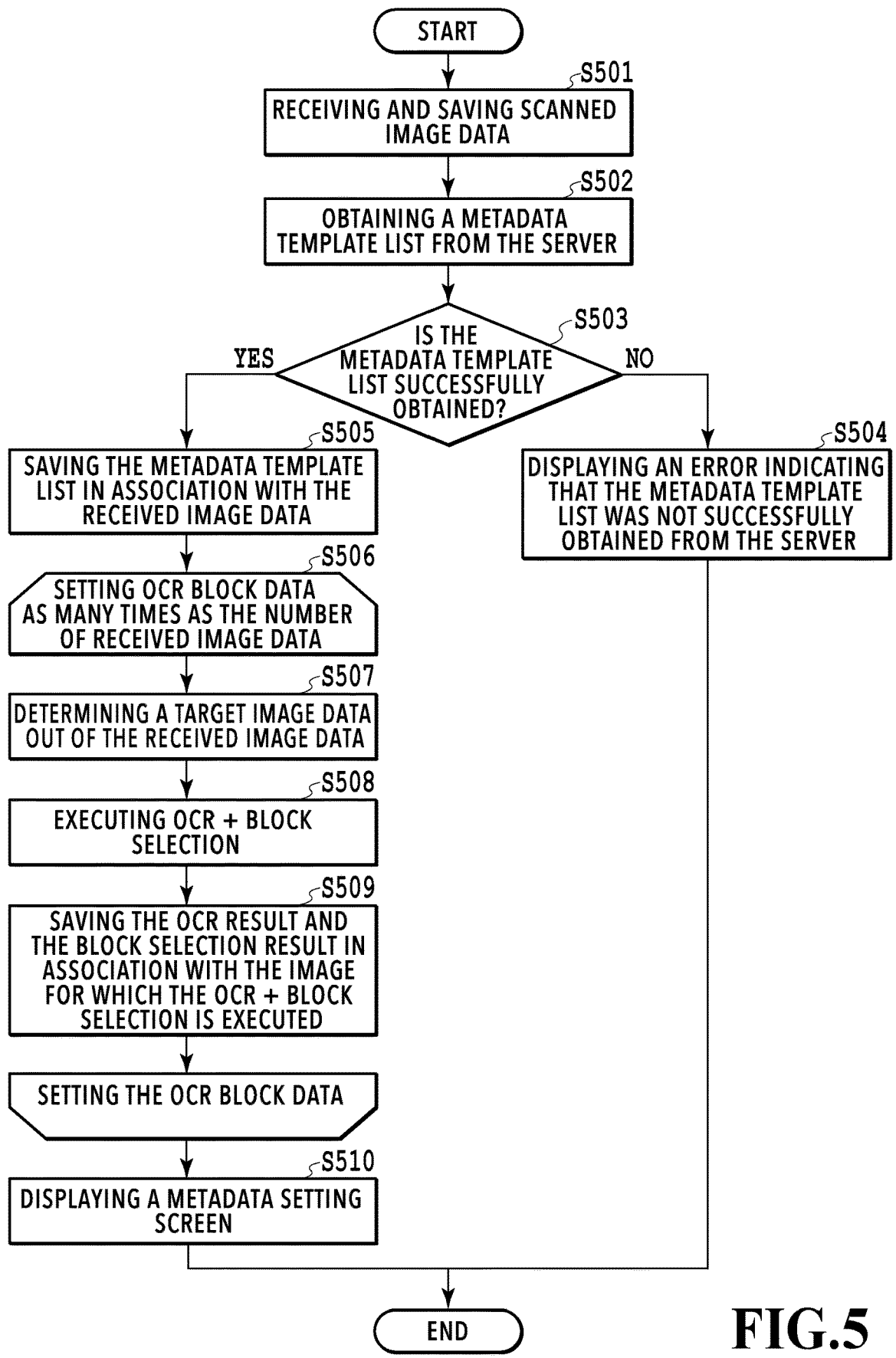
FIG. 5 is an example of a flowchart of generating a metadata setting screen.

FIG. 5 is an example of a flowchart in which the MFP 101 generates a metadata setting screen. Note that programs related to the processing illustrated in the present flowchart are stored in the storage unit 213 of the MFP 101, called by the RAM 212, and executed by the CPU 211. Note that the present flowchart represents the details of the processes of S1503 and S1504 in FIG. 15.

In S501, upon receiving scanned image data from the scanner 203 via the scanner OF 216, the CPU 211 saves the scanned image data in the storage unit 213.

Subsequently, in S502, the CPU 211 obtains the URL of the server 105, which is the transmission target, from the storage unit 213 and obtains a metadata template list from the server 105. Here, the metadata template list is a list of metadata templates registered in the server 105, and, in the example of Table 1, refers to a list of the two metadata templates "ACCOUNTING" and "LEGAL AFFAIRS". In addition, each metadata template of each metadata template list includes a key list, in which the character strings of the keys of the metadata template and the data types of the values corresponding to the keys are registered as a set.

In the example of the metadata template of "ACCOUNTING" in Table 1, the key list includes information of "ORDER NUMBER, TEXT-TYPE", "DUE DATE, DATE-TYPE", "TOTAL MONEY AMOUNT, NUMERIC-VALUE-TYPE", and "DOCUMENT TYPE, SELECTION-TYPE". The reason for obtaining the metadata template list every time scanned image data is received is that there is always a possibility that the metadata template in the server 105 is changed, and, therefore, it is necessary to obtain the latest metadata template list.

In S503, the CPU 211 determines whether the metadata template list is successfully obtained or not.

In a case where the metadata template list is not successfully obtained, the processing jumps to S504, so that the CPU 211 displays an error message indicating that the metadata template list was not successfully obtained from the server 105, and the present flow ends. Note that, in the present flow, in the case where the metadata template list is not successfully obtained, the error message is displayed as explained in S504 and the processing ends. However, there may be a form in which only scanned image data is transmitted to the server 105 without attaching metadata.

In a case where the metadata template list is successfully obtained, the processing jumps to S505, so that the CPU 211 saves the metadata template list in association with the scanned image data received from the scanner 203. The reason for assigning a metadata template list to scanned image data is that the contents of a metadata template list may change depending on the timing of receiving the metadata template list.

Subsequently, in S506, the CPU 211 sets OCR block data for all the received scanned image data by repeating the following steps S507 through S509 as many times as the number of scanned image data.

In S507, the CPU 211 determines a target scanned image data, based on a predetermined criterion such as the order of scanning, from among the scanned image data for which OCR block data is not associated and saved, out of the received scanned image data.

In S508, the CPU 211 executes OCR processing and block selection processing for the determined target scanned image data, so as to obtain OCR block data. The OCR processing is processing of extracting character string information as digital data from a scanned image. Furthermore, the block selection processing is processing of detecting a character area from scanned image data.

In S509, the CPU 211 saves the OCR block data obtained in S508 in association with the scanned image data.

Through the above processes (S506 through S508), the CPU 211 can extract OCR information of each block from each scanned image data.

Finally, in S510, the CPU 211 displays a metadata setting screen on the touch panel screen 401 of the operation unit 204 via the operation unit I/F 217, and the present flow ends.

Note that, although the example in which the above processing is performed in the MFP 101 is described in the present flow, it is also possible that an MFP only transmits scanned image data to the server 105, so that the above processing is performed in the server 105. Furthermore, there may be such a configuration in which the above processing is performed in an image processing server other than the server 105, so that scanned image data associated with OCR block data is transmitted to the server 105, which has a role as a storage.

Figure 6:
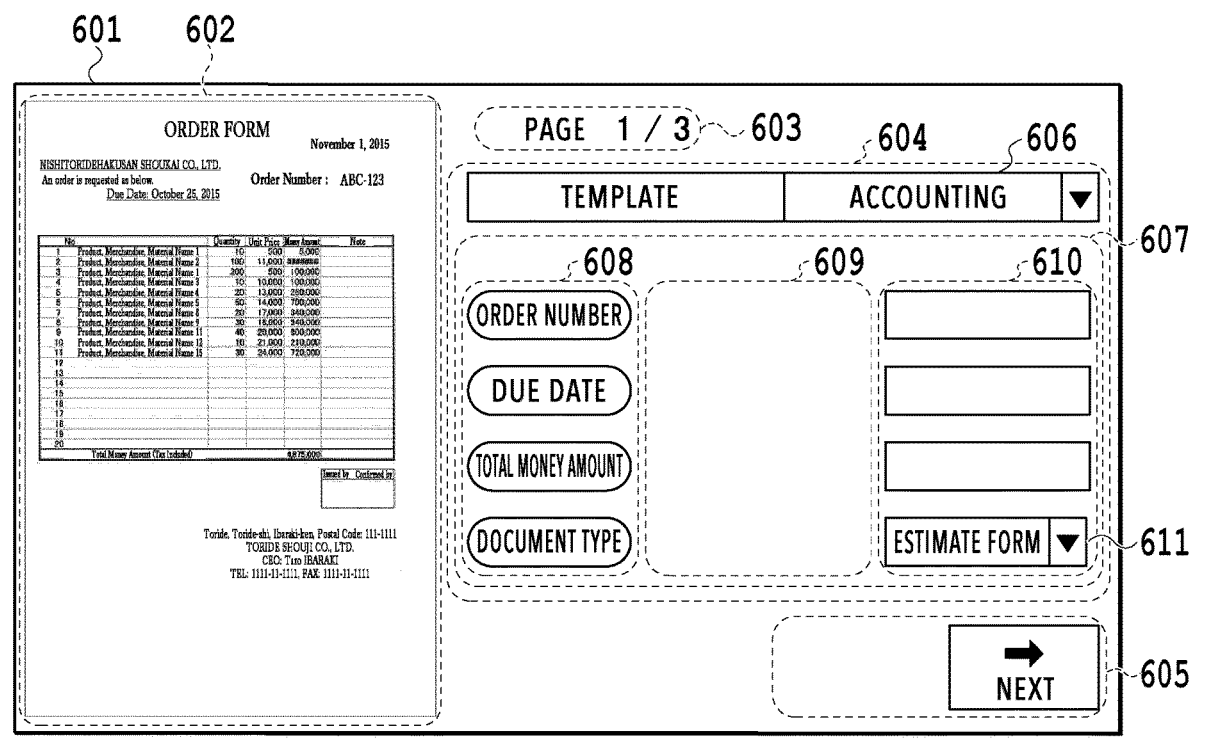

FIG. 6 is an example of a configuration diagram of a metadata setting screen. With reference to the present drawing, an explanation is given of an operation flow of the user in metadata setting. The metadata setting screen 601 is configured with a preview display section 602 for scanned image data, a metadata setting page number display section 603, a metadata setting section 604, and a page transition instruction section 605.

The preview display section 602 displays a preview screen of scanned image data. The metadata setting page number display section 603 displays the page number of the scanned image data displayed on the preview display section 602 in the entire scanned image data. In the present example, the first page of the three scanned pages is illustrated.

The page transition instruction section 605 displays a button for the user to provide an instruction for display transition between pages for setting metadata. Since the first page of the three pages is displayed in the present example, a button for transition to the next page is displayed. Note that the page transition instruction section 605 is configured to be dynamically changed for each page, such that buttons for transition to the previous and next pages are displayed in the middle page, a button for transmission to a server is displayed on the last page, etc.

The metadata setting section 604 is an input section for setting metadata for the scanned image data displayed in the preview display section 602. The metadata setting section 604 is configured with a metadata template selection form 606 and a metadata setting section 607. The metadata setting section 607 is a screen for setting the metadata template selected in the metadata template selection form 606.

The metadata setting section 607 is configured with a key display section 608, a value image display section 609, and a value input form 610.

The key display section 608 is configured to dynamically change keys to be displayed, according to the metadata template that has been set in the metadata template selection form 606. Since "ACCOUNTING" is set as the metadata template in the present example, "ORDER NUMBER", "DUE DATE", "TOTAL MONEY AMOUNT", and "DOCUMENT TYPE" are displayed as keys that are associated with the metadata template of "ACCOUNTING". In a case where the metadata template is changed to another metadata template by the user through the metadata template selection form 606, the keys displayed in the key display section 608 are also dynamically changed. Note that a value corresponding to a key can be set by use of the key display section 608 and the preview display section 602.

Figure 7A:
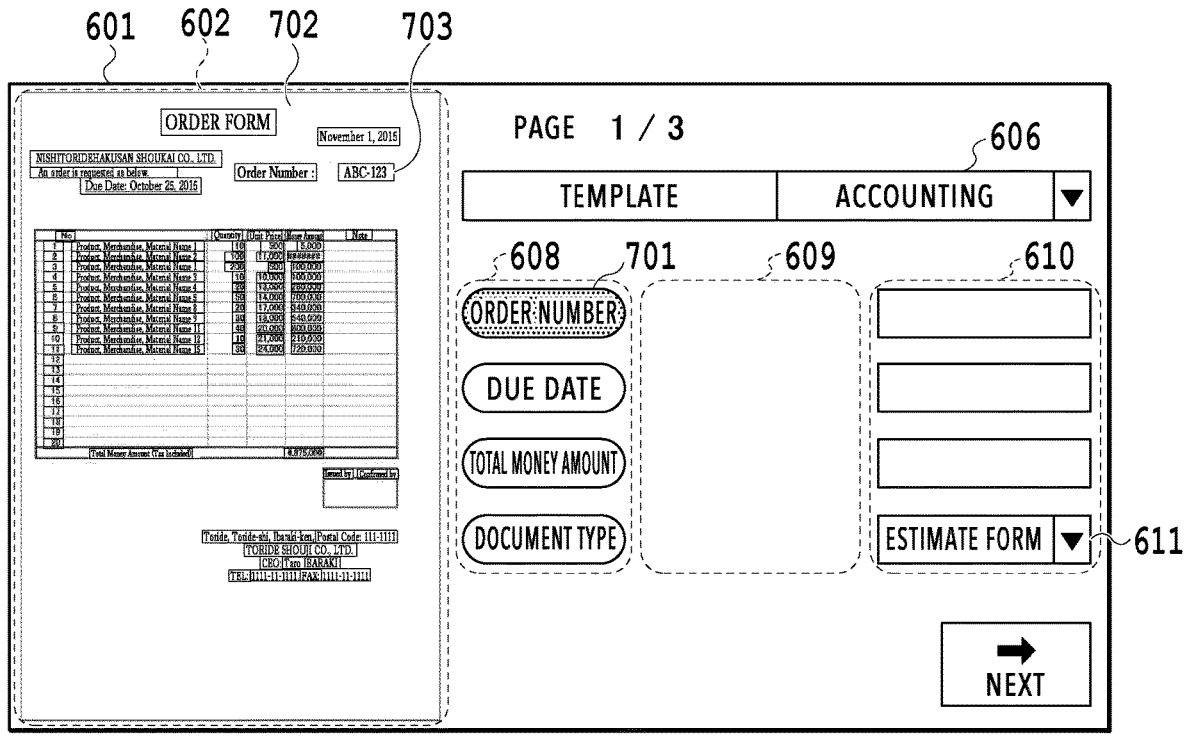
FIG. 7A is an example of a screen flow at the time of setting metadata on a metadata setting screen.
Figure 7B:
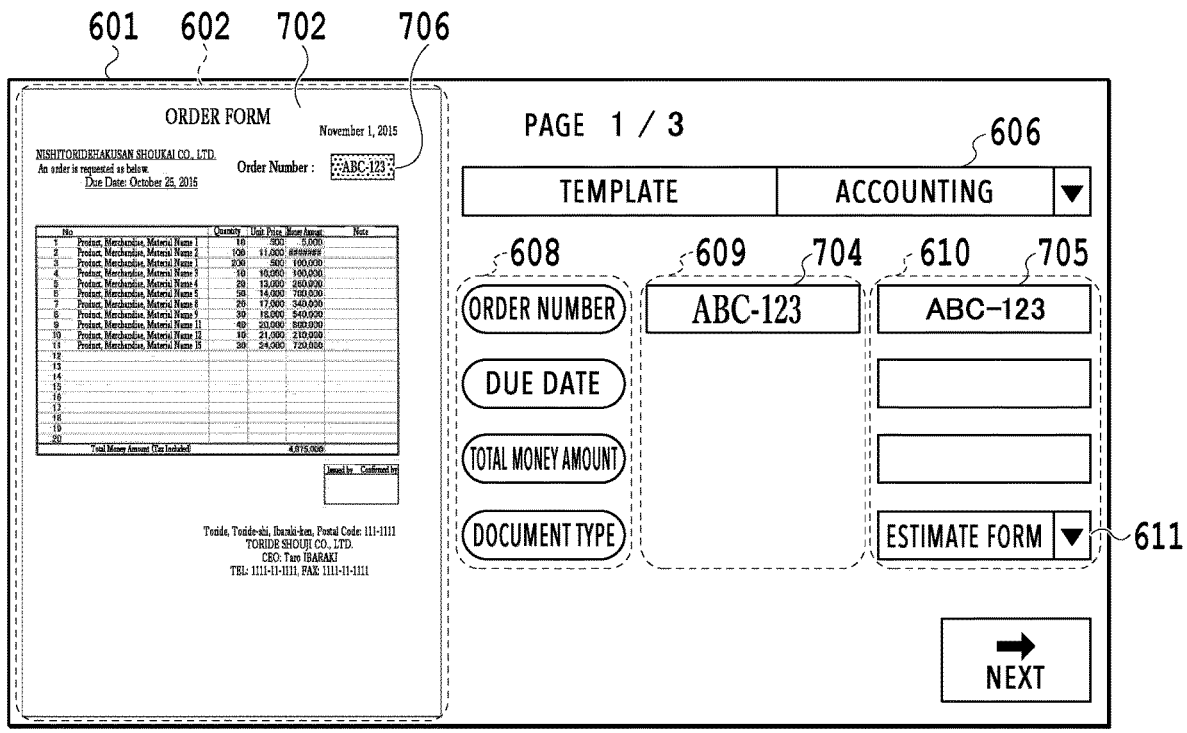
FIG. 7B is an example of a screen flow at the time of setting metadata on a metadata setting screen.

FIGS. 7A and 7B are examples of a screen flow at the time of setting metadata on a metadata setting screen. Upon detecting pressing of the key 701, the CPU 211 obtains OCR block data from the storage unit 213. Furthermore, the CPU 211 displays, in the preview display section 602, an OCR selection screen 702 on which an area that can be set as a block is enclosed by a selectable frame (FIG. 7A). In a case where the user presses the area 703, which is to be set as a value, on the OCR selection screen 702 or presses a key in the key display section 608, the CPU 211 obtains OCR block data from the storage unit 213 in response to detection of the pressing. From the obtained OCR block data, the CPU 211 displays the value image 704 on the same line as the corresponding key of the value image display section 609. Furthermore, the extracted OCR text data 705 is set in the value input form 610 (FIG. 7B). Accordingly, it is possible to improve convenience since each value can be input by a touch operation without the transcription work by the user.

Although the example in which a value is set by use of the key display section 608 and the preview display section 602 in FIGS. 7A and 7B, it is also possible that the user directly inputs text data to the value input form 610. In this case, the user presses the value input form 610 and sets a value by use of a soft keyboard or a hard keyboard.

Note that each value input form 610 is preferably configured to have a restriction for input, according to the data type of a value of each metadata. For example, in FIG. 6, as for the "DUE DATE" key, in a case where the data type of the value is date-type, it is preferable to make a soft keyboard for only inputting a date appear. Furthermore, as for the "TOTAL MONEY AMOUNT" key, in a case where the data type of the value is numeric-value-type, it is preferable to make a soft keyboard for only inputting a numeric value appear. Similarly, in a case where that the data type of the value for the "DOCUMENT TYPE" key is selection-type, a method of using the drop-down selection form 611 to select the value is preferable. FIG. 8 is an example of a display screen in a case where the user presses the drop-down selection form 611. By pressing the drop-down selection form 611, the drop-down list 801 of values is displayed, so that it is possible to only select a value that can be input.

Figure 9:
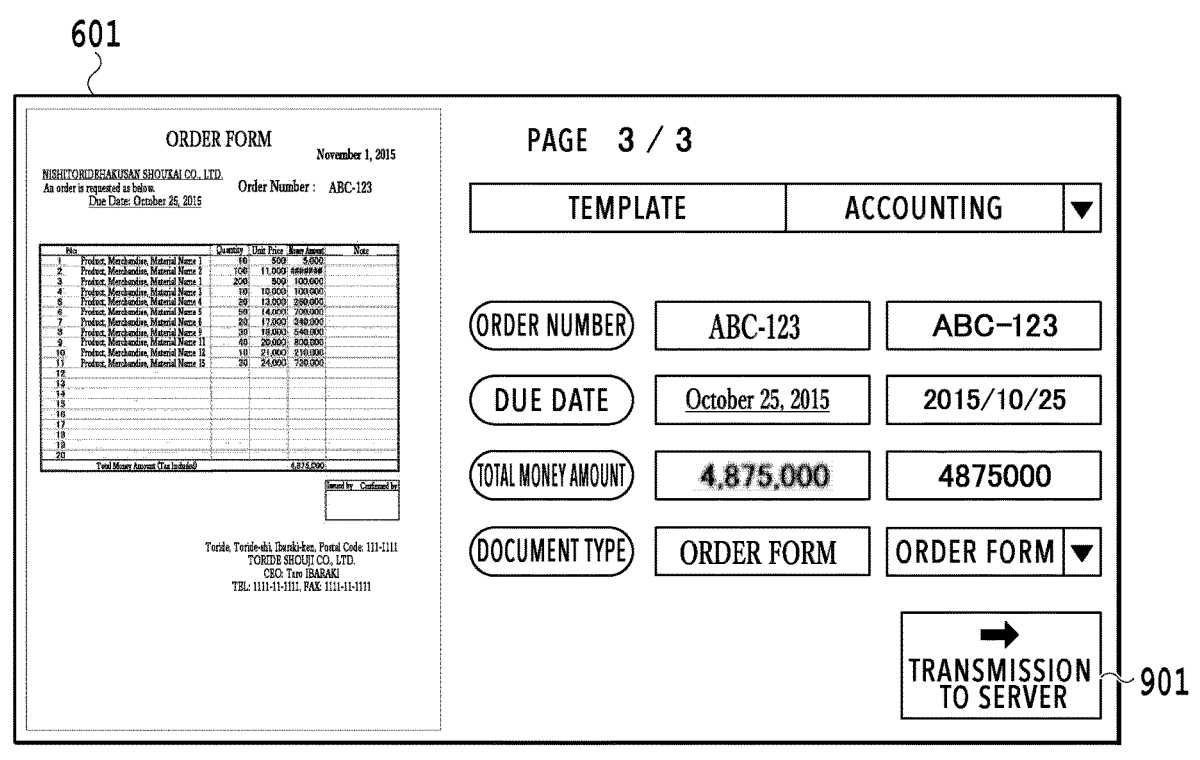

FIG. 9 is an example of a screen after metadata is set by the above-described method. In a case where all necessary metadata must be input due to a restriction from the server 105, transmission to the server 105 may become possible upon completion of all input. Furthermore, in a case where the server 105 does not require all metadata to be input, transmission is possible even though all input in the metadata setting section 604 are not completed.

As described above, by completing setting of metadata for all pages (all scanned image data) and pressing the "TRANSMISSION TO SERVER" button 901 in the page transition instruction section 605, scanned image data for which metadata is set is finally transmitted to the server 105.

The above is the sequence of the flow of setting metadata in the MFP 101 in a case of transmitting scanned image data to the server 105.

Next, an explanation is given of examples of a screen and preprocessing for displaying an appropriate value candidate at an upper level of a drop-down form in a case of selection-type in the present embodiment.

Figure 10B:
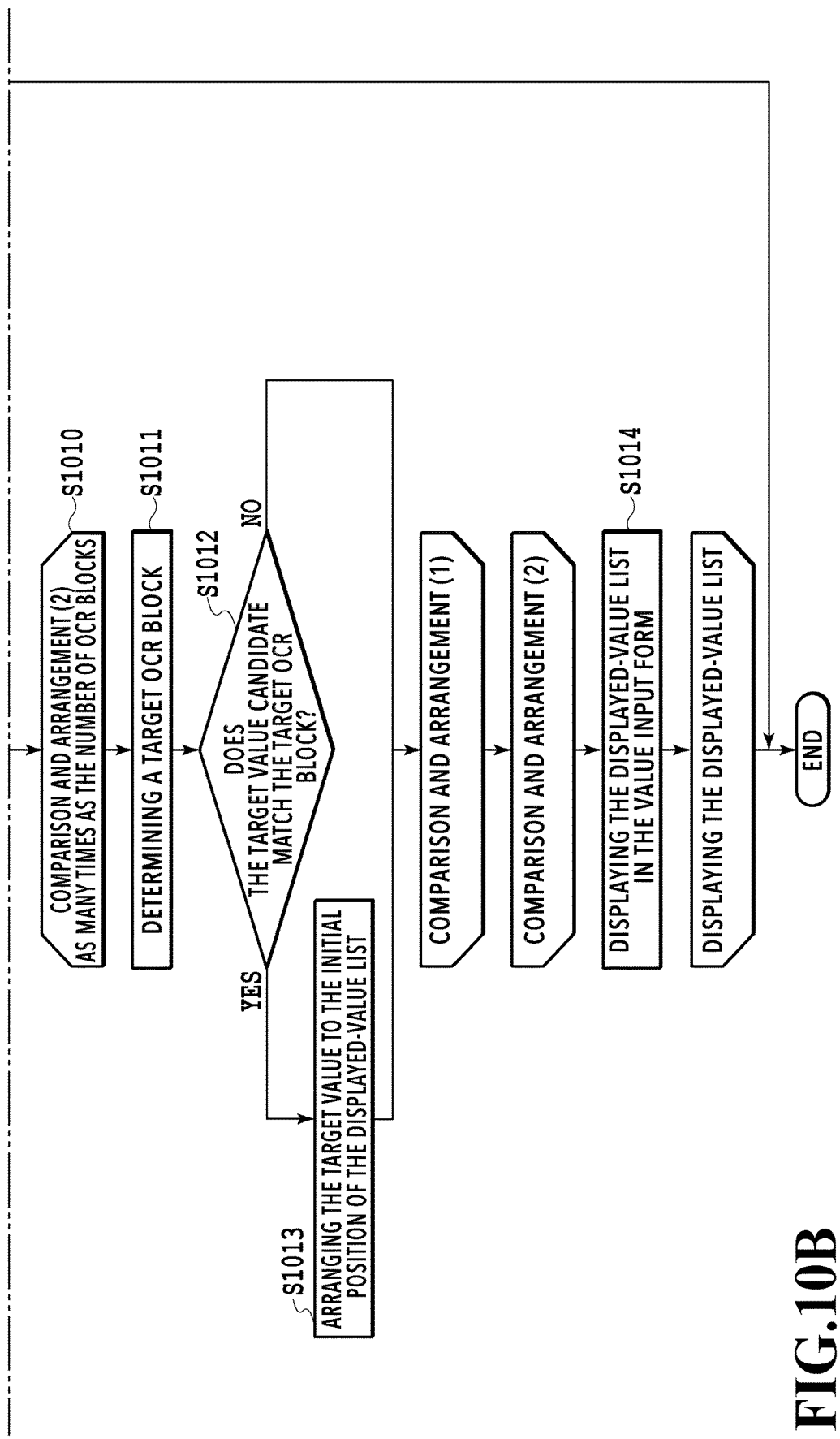

FIG. 10 is an example of a flow of generating a displayed-metadata list and displaying metadata in the first embodiment. Note that programs related to the processing illustrated in the present flowchart are stored in the storage unit 213 of the MFP 101, called by the RAM 212, and executed by the CPU 211.

In S1001, the CPU 211 detects selection of a metadata template.

In S1002, the CPU 211 searches for a key corresponding to a selection-type value in the selected metadata template. In a case where a key corresponding to a selection-type value is not present, the present flow ends. Contrarily, in a case where a key corresponding to a selection-type value is present, the processing jumps to S1003.

In S1003, the CPU 211 displays a displayed-value list for all the selection-type values by repeating the following processes of S1004 through S1013 as many times as the number of keys corresponding to the selection-type values.

First, in S1004, the CPU 211 determines a target key from among the keys for which a displayed-value list has not been generated, out of the keys corresponding to the selection-type values.

In S1005, the CPU 211 obtains a value list that defines value candidates for the value corresponding to the target key. For example, regarding the above-described Table 1, in a case of the "DOCUMENT TYPE" key, which corresponds to a selection-type value, the value candidates defined in the corresponding value list are "ESTIMATE FORM", "DELIVERY FORM", and "ORDER FORM".

Subsequently, in S1006, the CPU 211 accesses the storage unit 213 and obtains the OCR block list associated with the scanned image data.

In S1007, the CPU 211 generates a displayed-value list for the value corresponding to the target key. The displayed-value list is a list of values rearranged in the order to be displayed in the drop-down list 801. Further, it is assumed that the displayed-value list includes all of the value candidates in the value list at the point of being generated.

The subsequent processing (S1008 through S1013) is processing for comparing each element in the value list with each element in the OCR block list.

In S1008, the CPU 211 changes the display order in the displayed-value list by repeating the following processes of S1009 through S1013 as many times as the number of value candidates in the value list.

First, in S1009, the CPU 211 determines one target value candidate from among the value candidates that have not been compared with the OCR blocks, out of the value candidates in the value list. Here, as a representative, it is assumed that the element at the initial position of the value list is to be the target value candidate.

In S1010, the CPU 211 determines whether to change the display order of the target value candidate or not by repeating the following processes of S1011 through S1013 as many times as the number of OCR blocks.

In S1011, one target OCR block is determined from among the OCR blocks that have not been compared with the value candidate, out of the obtained OCR block list. Here, as a representative, it is assumed that the element at the initial position of the OCR block list is to be the target OCR block.

In S1012, the CPU 211 compares the target value candidate and the target OCR block, so as to determine whether the character string of the target value candidate matches the character string of the target OCR block.

In a case where it is determined in S1012 that the target value candidate matches the target OCR block, the CPU 211 adds the value candidate that matches the target OCR block to the initial position of the displayed-value list in S1013. In a case where it is determined in S1012 that the target value candidate does not match the target OCR block, nothing is performed to the displayed-value list.

In a case where the comparison of value candidates in a value list with the OCR blocks is completed for all the keys corresponding to selection-type values in the above-described manner, the processing exits the loop of S1008 and jumps to S1014. In S1014, the CPU 211 displays the displayed-value list in the drop-down selection form 611.

Note that, although the above-described example is an example of full match in the comparison in S1012, it is possible to set a condition for matching, such as prefix match, partial match, or suffix match. Furthermore, it is also possible to change the order in the displayed-value list according to the matching format. For example, there may be such a form in which the list is rearranged according to the matching rate, such that, in a case of full match, the value is displayed at the top and, in a case of partial match, the value is inserted below a full match value.

FIG. 11A and FIG. 11B are examples of a screen flow at the time where a drop-down selection form is pressed in the first embodiment. In a case where a displayed-value list is present, the CPU 211 displays the corresponding drop-down form in the order according to the displayed-value list. Note that, in a case where no displayed-value list is present, the CPU 211 directly displays the value list obtained in S1004 in the corresponding drop-down form. That is, the list is displayed in an order that is not related to the scanned image data, for example.

In a case where a displayed-value list is present, the CPU 211 displays the value at the top of the displayed-value list in the drop-down selection form 1101 as a default value (FIG. 11A). According to the present embodiment, since a character string that matches OCR information of scanned image data is set as a default value of a selection-type value, the selection work is not necessary and it is possible to input metadata efficiently. Furthermore, in a case where there are multiple candidates in a displayed-value list, the candidates are displayed at upper levels of the drop-down list 1102, which is displayed in response to pressing of the drop-down button (FIG. 11B).

As described above, in the technology of the present disclosure, since a value candidate that is present in scanned image data is preferentially displayed, it is possible for the user to easily select an appropriate value candidate.

Embodiment 2

In the example described in the first embodiment, regarding a key corresponding to a selection-type value, in a case where there is a value that matches a predefined value candidate among the character strings included in target scanned image data, the value is displayed at an upper level in a drop-down list, so as to improve convenience.

In the example described in the second embodiment, regarding a key corresponding to a selection-type value, only in a case where there is a value that matches a value candidate defined in a value list among the character strings included in target scanned image data, the value is displayed in a drop-down list.

Figure 12B:
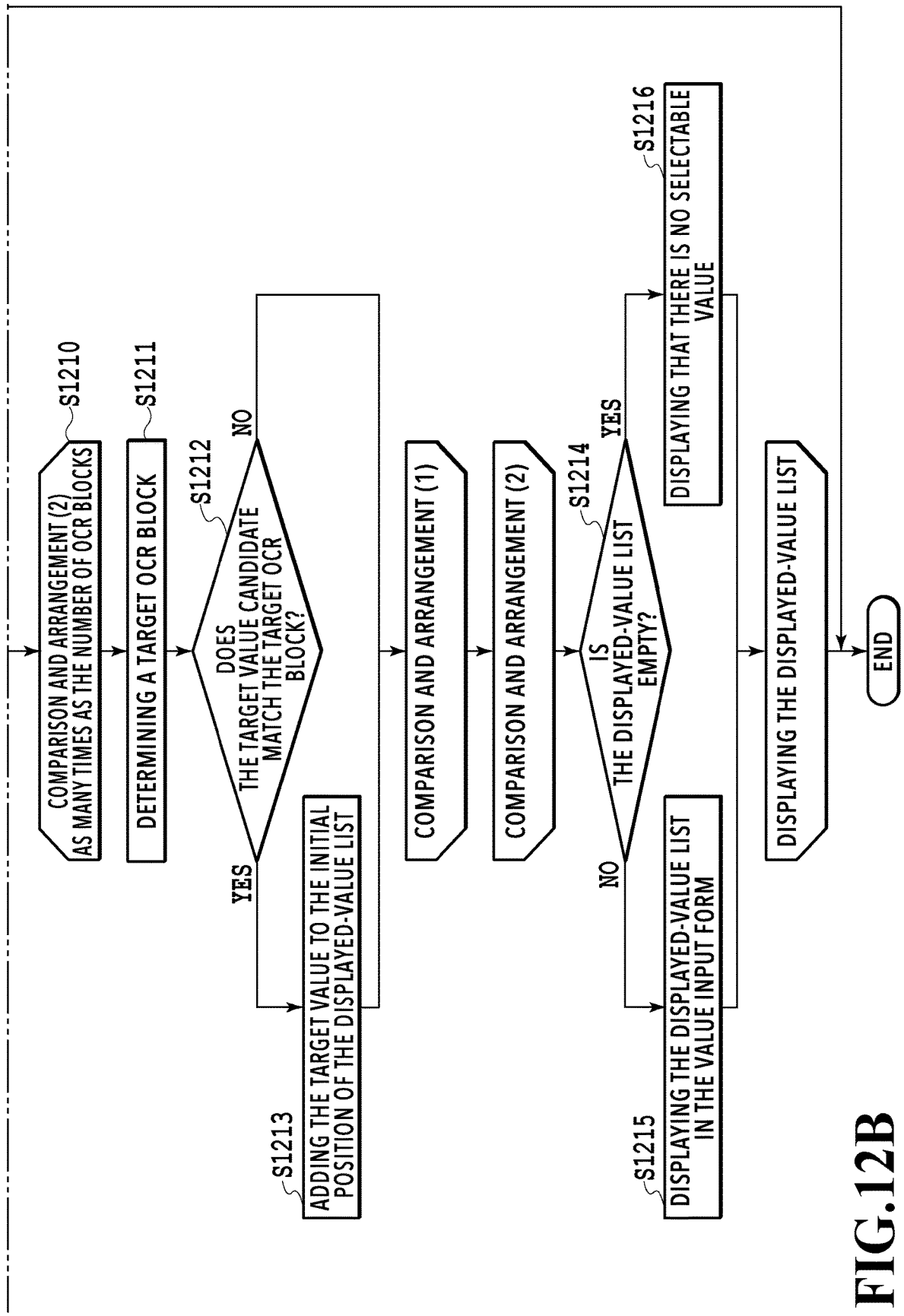
Figures 13A, 13B:
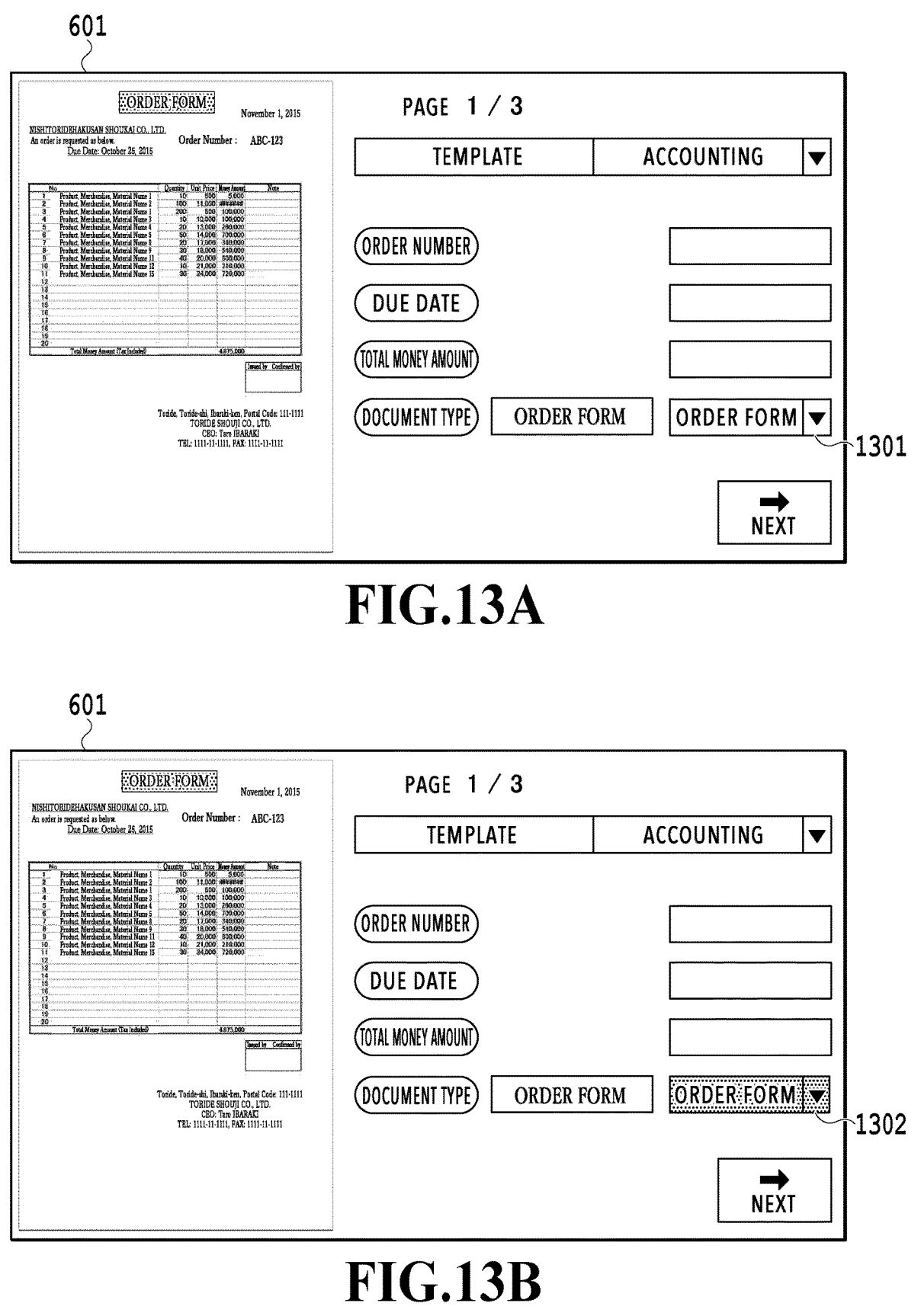
Figure 14:
FIG. 14 is an example of a metadata setting screen in a case where no value is present in a displayed-metadata list in the second embodiment.

FIG. 12 is an example of a flow of generating a displayed-metadata list and displaying metadata in the second embodiment. Furthermore, FIGS. 13A, 13B, and 14 are examples of a metadata setting screen to which the displayed-metadata list generated in FIG. 12 is applied. With reference to the drawings, a description is given of the flow of generating a metadata setting screen according to the second embodiment.

Note that programs related to the processing illustrated in the flowchart of FIG. 12 are stored in the storage unit 213 of the MFP 101, called by the RAM 212, and executed by the CPU 211. S1201 to S1206 and S1208 to S1212 correspond to the steps S1001 to S1006 and S1008 to S1012 in the first embodiment, and the steps represent the same processes. Therefore, the explanations thereof are omitted.

S1207 and S12013 are different from the processes of S1007 and S1013. Thus, explanations thereof are given below.

In S1207, the CPU 211 generates a displayed-value list of values corresponding to the target key. The displayed-value list is a list of values rearranged in the order to be displayed in the drop-down list 801. Further, it is assumed that the displayed-value list is empty at the point of being generated.

In a case where it is determined in S1212 that the character string of the target value candidate matches the character string of the target OCR block, the CPU 211 adds the target value to the initial position of the displayed-value list in S1213. In a case where it is determined in S1012 that the target value candidate does not match the target OCR block, nothing is performed to the displayed-value list. Note that, as in the first embodiment, full match, partial match, prefix match, suffix match, or the like, may be applied to the herein-described matching. Furthermore, it is preferable to change the order in the displayed-value list according to the matching rate thereof.

After comparing all the value candidates defined in a value list with all the OCR blocks of the scanned image data for all the keys corresponding to selection-type values in the above-described manner, the CPU 211 determines whether the displayed-value list is empty or not in S1214.

In a case where it is determined in S1214 that the displayed-value list is not empty, the processing jumps to S1215, so that the CPU 211 displays the displayed-value list in the value input form in S1215.

FIGS. 13A and 13B are examples of a metadata setting screen in a case where the displayed-value list is not empty. In the present examples, it is assumed that the elements of Table 1 are applied. Here, the value corresponding to the "DOCUMENT TYPE" key is selection-type, and, in the target scanned image data, the character string that matches the value candidates defined in the value list is "ORDER FORM" only. Therefore, "ORDER FORM" is displayed as a default value in the drop-down selection form 1301 (FIG. 13A).

However, even in a case where the drop-down button is clicked, since there is only one element in the displayed-value list, only "ORDER FORM" can be selected in the drop-down list 1302 (FIG. 13B). Note that, in a case where there are multiple elements in the displayed-value list, the multiple elements are displayed. Furthermore, as in the first embodiment, a form in which the value at the highest position is set as the default value is preferable.

Contrarily, in a case where it is determined in S1214 that the displayed-value list is empty, the processing jumps to S1216. In S1216, the CPU 211 displays that there is no selectable value candidate because no value in the scanned image data matches the value candidates defined in the value list, on a part of the screen corresponding to the target key. FIG. 14 is an example of a metadata setting screen in a case where the displayed-value list is empty. In this example, similarly, it is assumed that the elements of Table 1 are applied. Here, the data type of the value corresponding to the "DOCUMENT TYPE" key is selection-type, and, in the target scanned image data, none of the character strings of "ESTIMATE FORM", "DELIVERY FORM", and "ORDER FORM", which are the candidates of the value, is present. Therefore, in the present embodiment, after making the drop-down list 1401 not selectable, the reason is displayed in the error content display form 1402. Other than the herein-described examples, another method may be used for the display method of error contents and the restriction method.

According to the present embodiment, among value candidates defined for a selection-type value, only values that match the OCR blocks of target scanned image data can be displayed. Therefore, in a case of assigning metadata to specific scanned image data, it is not possible that a value that does not exist in the scanned image data is erroneously set. As a result, input errors of the user can be reduced, the precision for inputting metadata can be improved, and convenience for the user can be improved.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

According to the technology of the present disclosure, candidates of a selection-type value included in metadata in a key-value format, which is registered in association with scanned image data, can be appropriately displayed.

This application claims the benefit of Japanese Patent Application No. 2019-111816 filed Jun. 17, 2019, which is hereby incorporated by reference wherein in its entirety.

What is claimed is:

1. An information processing apparatus that sets metadata to scanned image data obtained by scanning a document, the information processing apparatus comprising:
a first obtaining unit configured to obtain a character string extracted from the scanned image data;
a second obtaining unit configured to obtain a template of the metadata;
a display control unit configured to display a screen that includes both of a plurality of keys and a plurality of input-forms for inputting values corresponding to the plurality of keys,
wherein the plurality of keys includes at least a first key and a second key, and
wherein the plurality of keys and data types of the values corresponding to the plurality of keys are defined in the obtained template of the metadata, the data types including a text-type and a selection-type, and
wherein the plurality of input-forms includes a first input-form of the text-type corresponding to the first key and a second input-form of the selection-type corresponding to the second key, and
wherein the display control unit displays a first character string in the first input-form of the text-type, wherein a default value of the first character string displayed in the first input-form is a character string corresponding to the first key obtained by the first obtaining unit, and
wherein, in a case where one of pre-defined candidates of the value of the selection-type satisfies a predetermined condition for matching with a character string corresponding to the second key obtained by the first obtaining unit, the display control unit displays, as a default value of a second character string in the second input-form of the selection-type, the one of pre-defined candidates of the value of the selection-type which satisfies the predetermined condition, and
wherein, in a case where none of the pre-defined candidates of the value of the selection-type satisfies the predetermined condition for matching with the character string corresponding to the second key obtained by the first obtaining unit, the display control unit displays the screen on which the default value of the second character string is not displayed in the second input-form; and
the information processing apparatus further comprising a setting unit configured to set, as the metadata of the scanned image data, the first character string being displayed in the first input-form and the second character string being displayed in the second input-form.

2. The information processing apparatus according to claim 1, wherein a user can change the default value of the second character string in the second input-form to other candidate of the pre-defined candidates of the value of the selection-type.

3. The information processing apparatus according to claim 1, wherein, in a case where the one of pre-defined candidates of the value of the selection-type satisfies the predetermined condition for matching with the obtained character string corresponding to the second key, the display control unit is configured to display the default value of the second character string as upper level in a list of the pre-defined candidates of the value of the selection-type.

4. The information processing apparatus according to claim 3, wherein the display control unit is configured to display the list as a drop-down list.

5. The information processing apparatus according to claim 2, wherein the setting unit is configured to set, as the second character string of the metadata of the scanned image data, the other candidate changed according to operation by the user.

6. The information processing apparatus according to claim 1, further comprising a transmitting unit configured to transmit the scanned image data as well as the key and the value that are set in association with the scanned image data to an external apparatus.

7. The information processing apparatus according to claim 6, wherein the second obtaining unit is configured to obtain the template of the metadata from the external apparatus.

8. The information processing apparatus according to claim 6, wherein the first obtaining unit is configured to obtain the character string from the external apparatus.

9. The information processing apparatus according to claim 1, wherein the first obtaining unit includes an extracting unit configured to extract the character string from the scanned image data.

10. The information processing apparatus according to claim 1, further comprising an image reading unit configured to read the document to generate the scanned image data.

11. The information processing apparatus according to claim 1, wherein the display control unit is configured to display a preview of the scanned image data in the screen.

12. An information processing method for setting metadata to scanned image data obtained by scanning a document, the information processing method comprising:
    obtaining a character string extracted from the scanned image data;
    obtaining a template of the metadata;
    displaying a screen that includes both of a plurality of keys and a plurality of input-forms for inputting values corresponding to the plurality of keys,
    wherein the plurality of keys includes at least a first key and a second key, and
    wherein the plurality of keys and data types of the values corresponding to the plurality of keys are defined in the obtained template of the metadata, the data types including a text-type and a selection-type, and
    wherein the plurality of input-forms includes a first input-form of the text-type corresponding to the first key and a second input-form of the selection-type corresponding to the second key, and
    wherein a first character string is displayed in the first input-form of the text-type, wherein a default value of the first character string displayed in the first input-form is the obtained character string corresponding to the first key, and
    wherein a second character string is displayed in the second input-form of the selection-type,
    wherein, in a case where one of pre-defined candidates of the value of the selection-type satisfies a predetermined condition for matching with the obtained character string corresponding to the second key, the one of pre-defined candidates which satisfies the predetermined condition is displayed as a default value of the second character string displayed in the second input-form, and
    wherein, in a case where none of the pre-defined candidates of the value of the selection-type satisfies the predetermined condition for matching with the obtained character string corresponding to the second key, the default value of the second character string is not displayed in the second input-form; and
    the information processing method further comprising setting, as the metadata of the scanned image data, the first character string being displayed in the first input-form and the second character string being displayed in the second input-form.

13. A non-transitory computer-readable storage medium storing a program that causes a computer to perform:
    obtaining a character string extracted from scanned image data;
    obtaining a template of the metadata;
    displaying a screen that includes both of a plurality of keys and a plurality of input-forms for inputting values corresponding to the plurality of keys,
    wherein the plurality of keys includes at least a first key and a second key, and
    wherein the plurality of keys and data types of the values corresponding to the plurality of keys are defined in the obtained template of the metadata, the data types including a text-type and a selection-type, and
    wherein the plurality of input-forms includes a first input-form of the text-type corresponding to the first key and a second input-form of the selection-type corresponding to the second key, and
    wherein a first character string is displayed in the first input-form of the text-type, wherein a default value of the first character string displayed in the first input-form is the obtained character string corresponding to the first key, and
    wherein a second character string is displayed in the second input-form of the selection-type,
    wherein, in a case where one of pre-defined candidates of the value of the selection-type at least partially matches the obtained character string corresponding to the second key, the one of pre-defined candidates which at least partially matches the obtained character string corresponding to the second key is displayed as a default value of the second character string displayed in the second input-form, and
    wherein, in a case where none of the pre-defined candidates of the value of the selection-type at least partially matches the obtained character string corresponding to the second key, the default value of the second character string is not displayed in the second input-form is one of pre defined candidates of the value of the selection type which at least partially matches the obtained character string corresponding to the second key; and
    the program further causing the computer to perform setting, as the metadata of the scanned image data, the first character string being displayed in the first input-form and the second character string being displayed in the second input-form.

14. The information processing apparatus according to claim 1, wherein the predetermined condition for the matching is full match, prefix match, partial match or suffix match.

15. An information processing apparatus that sets metadata to image data, the information processing apparatus comprising:
    an obtaining unit configured to obtain a character string extracted from the image data;
    a display control unit configured to display a screen that includes both of a plurality of keys and a plurality of input-forms for inputting values corresponding to the plurality of keys,
    wherein the plurality of input-forms includes an input-form for inputting value of a selection-type, and
    wherein, in a case where one of pre-defined candidates of the value of the selection-type satisfies a predetermined condition for matching with a character string corresponding to the key obtained by the first obtaining unit, the display control unit displays, as a default value of a character string in the input-form for inputting value of the selection-type, the one of pre-defined candidates of the value of the selection-type which satisfies the predetermined condition, and wherein, in a case where none of the pre-defined candidates of the value of the selection-type satisfies the predetermined condition for matching with the character string corresponding to the key obtained by the first obtaining unit, the display control unit displays the screen on which the default value of the character string is not displayed in the input-form for inputting value of the selection-type; and the information processing apparatus further comprising a setting unit configured to set, as the metadata of the scanned image data, the character strings being displayed in the plurality of input-forms.

* * * * *